(12) United States Patent
Nakano et al.

(10) Patent No.: US 10,464,589 B2
(45) Date of Patent: Nov. 5, 2019

(54) STEERING CONTROL DEVICE

(71) Applicant: KABUSHIKI KAISHA TOKAI RIKA DENKI SEISAKUSHO, Aichi (JP)

(72) Inventors: Ryoko Nakano, Aichi (JP); Jun Kawamori, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/065,473

(22) PCT Filed: Jan. 18, 2017

(86) PCT No.: PCT/JP2017/001553
§ 371 (c)(1),
(2) Date: Jun. 22, 2018

(87) PCT Pub. No.: WO2017/130815
PCT Pub. Date: Aug. 3, 2017

(65) Prior Publication Data
US 2018/0370556 A1    Dec. 27, 2018

(30) Foreign Application Priority Data

Jan. 27, 2016   (JP) .................................. 2016-013448

(51) Int. Cl.
*B62D 1/10*     (2006.01)
*B62D 1/04*     (2006.01)
*B60K 35/00*    (2006.01)

(52) U.S. Cl.
CPC .............. *B62D 1/105* (2013.01); *B60K 35/00* (2013.01); *B62D 1/046* (2013.01); *B60K 2370/782* (2019.05)

(58) Field of Classification Search
CPC .......... B62D 1/105; B62D 1/10; B62D 1/046; B62D 1/04
See application file for complete search history.

(56) References Cited

U.S. PATENT DOCUMENTS 8,466,382 B2 *  6/2013  Donicke .............. B60Q 1/1461
                                                    200/61.54
9,552,148 B2 *  1/2017  Kim ...................... B62D 1/046
(Continued)

FOREIGN PATENT DOCUMENTS

DE      10117824 A1      10/2002
JP      2013-025620 A    2/2013

OTHER PUBLICATIONS

International Preliminary Report on Patentability issued in International Application No. PCT/JP2017/001553 dated Aug. 9, 2018.
(Continued)

*Primary Examiner* — Daniel D Yabut
(74) *Attorney, Agent, or Firm* — Roberts Mlotkowski Safran Cole & Calderon P.C.

(57) ABSTRACT

A steering control device includes a steering wheel configured to allow a traveling direction of a vehicle to be adjusted depending on performed turning operation, an input operation unit disposed in a center region of the steering wheel and configured to receive input operation by an operator, a switching unit connected to the steering wheel and the input operation unit and configured to switch a turn of the steering wheel between a turn of the steering wheel together with the input operation unit and a turn of only the steering wheel, and a controller configured to control the switching unit such that only the steering wheel turns in accordance with an input of an input signal indicating a start of a self-driving mode in which a turn of the steering wheel is controlled.

5 Claims, 3 Drawing Sheets

(56) References Cited

U.S. PATENT DOCUMENTS

| | | | | |
|---|---|---|---|---|
| 2006/0286944 A1* | 12/2006 | Songwe, Jr. | ............ | B60K 35/00 455/99 |
| 2013/0133468 A1* | 5/2013 | Rancan | .................... | B62D 1/04 74/552 |
| 2017/0106894 A1* | 4/2017 | Bodtker | ................. | B62D 1/183 |

OTHER PUBLICATIONS

International Search Report issued in a corresponding application No. PCT/JP2017/001553 dated Mar. 14, 2017.

* cited by examiner

STEERING CONTROL DEVICE

CROSS-REFERENCE TO RELATED APPLICATIONS

The present application is a U.S. National Phase of PCT/JP2017/001553 filed on Jan. 18, 2017 claiming priority to Japanese Patent Application No. 2016-013448 filed on Jan. 27, 2016. The disclosure of the PCT Application is hereby incorporated by reference into the present Application.

TECHNICAL FIELD

The present invention relates to a steering control device.

BACKGROUND ART

Onboard systems are known including a display disposed in the center pad of a steering wheel and a touch panel disposed on the display (See Patent Document 1).

The display disclosed in PTL 1 is disposed within the center pad of a steering wheel. In addition, a touch panel is disposed on the display surface of the display. This display and touch panel turn with the steering wheel.

CITATION LIST

Patent Literature

Patent Document 1: JP 2013-25620 A

SUMMARY OF INVENTION

Technical Problem

The onboard system disclosed in Patent Document 1, for example, is not good in operability, because, in a case that a vehicle automatically controls a steering wheel in accordance with surrounding conditions in a self-driving mode to change the course of the vehicle, the input operation unit (touch panel, etc.) integrally installed in the center region of the steering wheel and configured to receive input operation turns together with the steering wheel.

An object of the invention is to provide a steering control device, whose input operation unit has good operability even in the self-driving mode.

Solution to Problem

A steering control device according to an embodiment of the invention includes a steering wheel configured to allow a traveling direction of a vehicle to be adjusted depending on performed turning operation; an input operation unit disposed in a center region of the steering wheel and configured to receive input operation by an operator; a switching unit connected to the steering wheel and the input operation unit and configured to switch a turn of the steering wheel between a turn of the steering wheel together with the input operation unit and a turn of only the steering wheel; and a controller configured to control the switching unit such that only the steering wheel turns in accordance with an input of an input signal indicating a start of a self-driving mode for controlling a turn of the steering wheel.

Advantageous Effects of Invention

According to an embodiment of the invention, a steering control device can be provided, whose input operation unit has good operability even in the self-driving mode.

DESCRIPTION OF EMBODIMENT

Overview of Embodiment

A steering control device according to embodiments, includes a steering wheel configured to allow a traveling direction of a vehicle to be adjusted by operated turning operation; an input operation unit disposed in a center region of the steering wheel and configured to receive input operation by an operator; a switching unit connected to the steering wheel and the input operation unit and configured to switch a turn of the steering wheel between a turn of the steering wheel together with input operation unit, and a turn of only the steering wheel; and a controller configured to control the switching unit such that only the steering wheel turns in accordance with an input of an input signal indicating a start of a self-driving mode for controlling a turn of the steering wheel.

A steering control device according to the embodiments includes an input operation unit having good operability even in the self-driving mode compared to related devices in which a steering wheel and an input operation unit turn together with each other, because only the steering wheel turns in the self-driving mode.

Embodiments

Summary of Steering Control Device 1

Figure 1A:
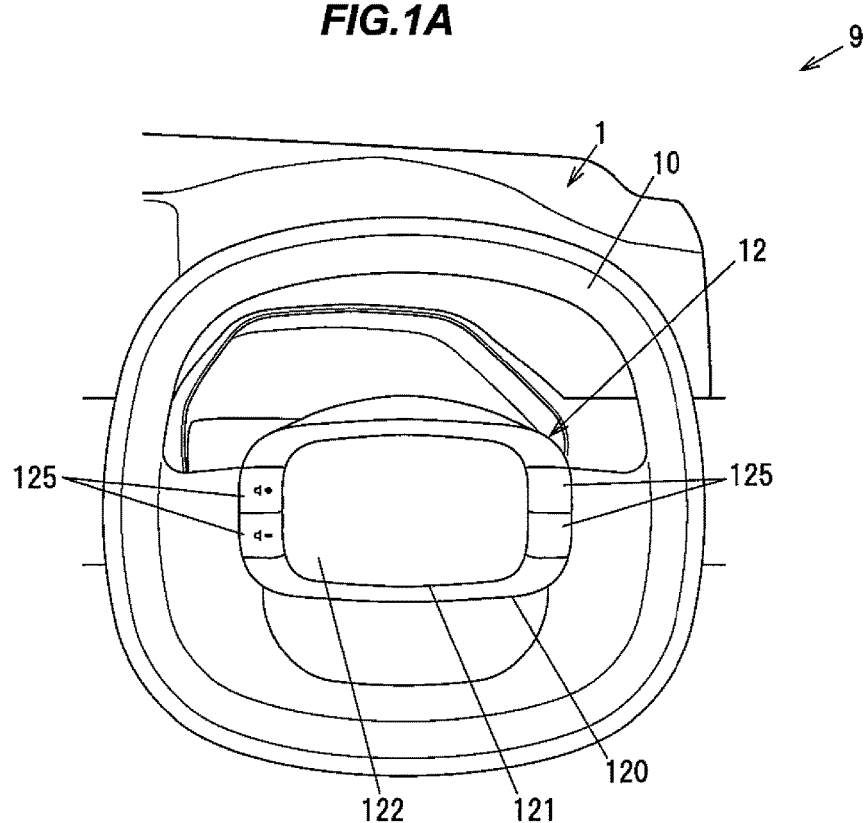
FIG. 1A is an explanatory drawing illustrating a steering control device according to an embodiment.
Figure 1B:
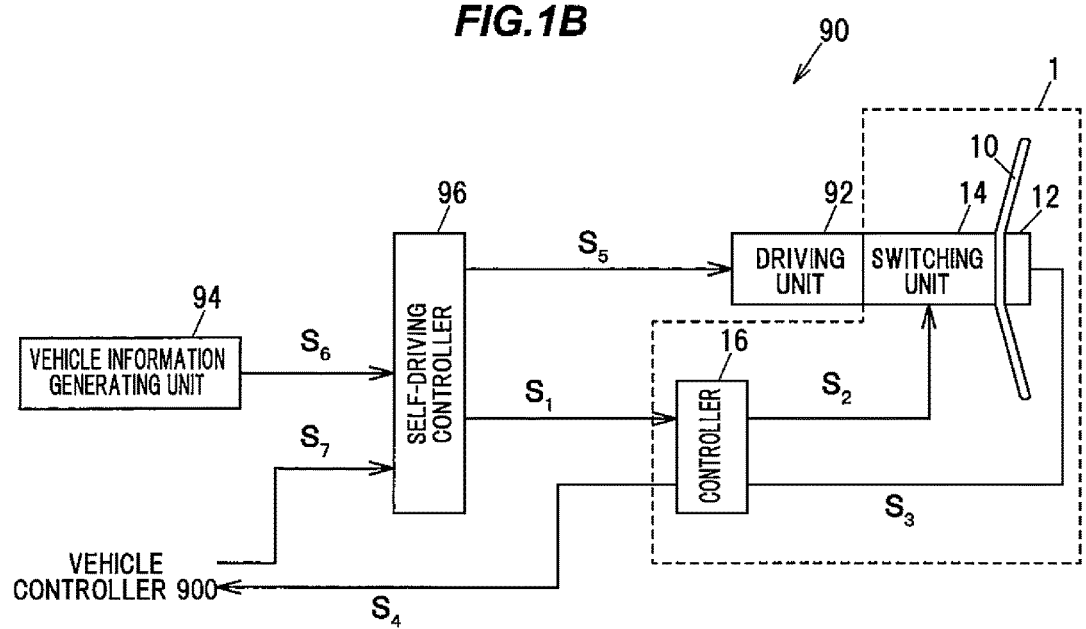
FIG. 1B is a block diagram of a steering control device and a vehicle control system including the steering control device.
Figure 2A:
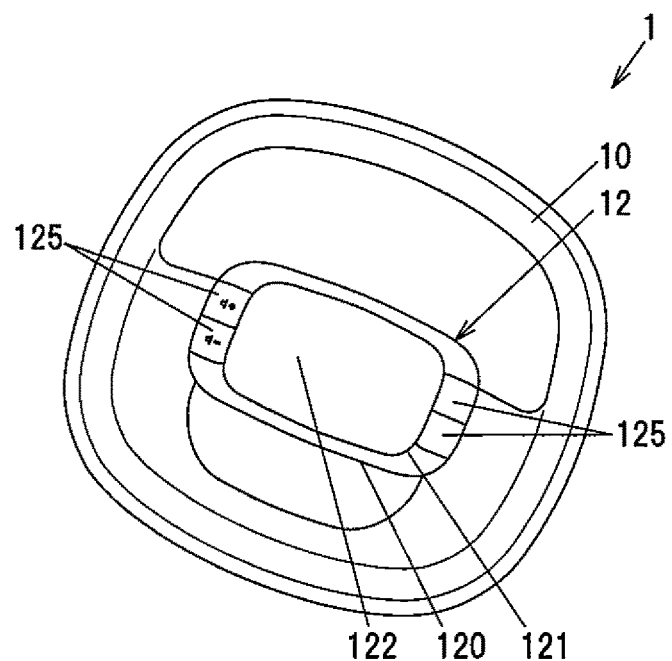
FIG. 2A is an explanatory drawing illustrating an example of the turning operation of a steering wheel in a manual driving mode of a steering control device according to an embodiment.
Figure 2B:
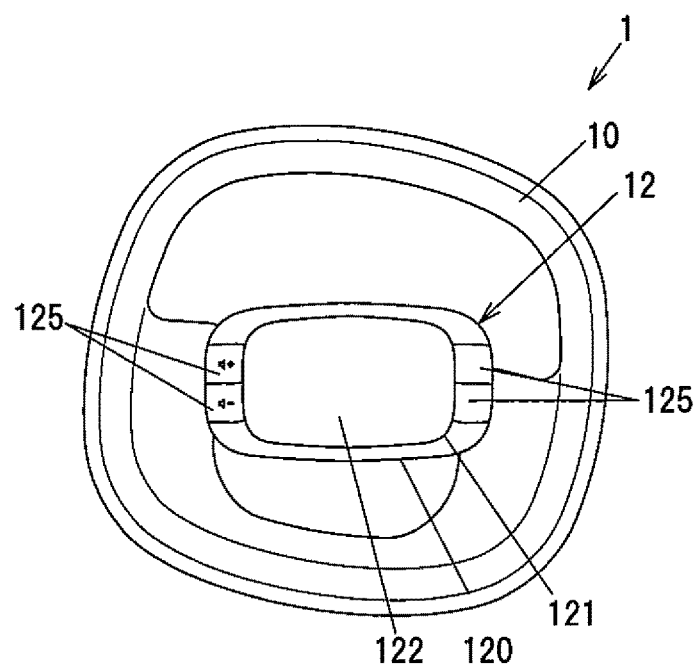
FIG. 2B is an explanatory drawing illustrating an example of the turning operation of a steering wheel in a self-driving mode.

FIG. 1A is an explanatory drawing illustrating a steering control device according to an embodiment, and FIG. 1B is a block diagram of a steering control device and a vehicle control system including the steering control device. FIG. 2A is an explanatory drawing illustrating an example of turning operation of a steering wheel when a steering control device according to the embodiment is in the manual driving mode, and FIG. 2B is an explanatory drawing illustrating an example of turning operation of the steering wheel in the self-driving mode. In the drawings associated with the following embodiments, ratios between elements in the drawings may be different from the actual ratios. In addition, in FIG. 1B, arrows indicate the flows of primary signals and information.

The steering control device 1 is configured to switch a turn between a turn of only the steering wheel 10 and a turn of the steering wheel 10 together with an input operation unit 12, depending on whether the driving mode of a vehicle 9 is the manual driving mode or the self-driving mode, for example.

Specifically, as illustrated in FIGS. 1A and 1B, the steering control device 1 includes a steering wheel 10 configured to allow a traveling direction of a vehicle 9 to be adjusted depending on performed turning operation; an input operation unit 12 disposed in a center region of the steering wheel 10 and configured to receive input operation by an operator; a switching unit 14 connected to the steering wheel 10 and the input operation unit 12 and configured to switch a turn between a turn of the steering wheel 10 together with the input operation unit 12 and a turn of only the steering wheel 10; and a controller 16 configured to control the switching unit 14 such that only the steering wheel 10 turns in accordance with an input of an input signal (mode signal S1) indicating a start of a self-driving mode for controlling a turn of the steering wheel 10.

The manual driving mode is a mode, for example, in which an operator operates a steering wheel 10. In addition, the self-driving mode is a mode, for example, in which the speed, brakes, or a traveling direction of a vehicle 9 is controlled until reaching a destination without being operated by an operator. The steering wheel 10 in this self-driving mode, for example, turns clockwise or counterclockwise in accordance with driving by a driving unit 92. The vehicle control system 90 illustrated in FIG. 1B is an example of a system configured to control the traveling direction of a vehicle 9 in the self-driving mode.

Configuration of Steering Wheel 10

As illustrated in FIG. 1A, the steering wheel 10 has a ring shape. This steering wheel 10 is the steering gear of a vehicle 9, and is configured to change the orientation of the wheels of the vehicle 9 via a steering shaft or the like.

Configuration of Input Operation Unit 12

As illustrated in FIG. 1A, the input operation unit 12 includes a touch pad 121 configured to detect touch operation on an operation surface 122, and switches 125 disposed around the touch pad 121, for example.

As illustrated in FIG. 1A, the input operation unit 12 includes the operation surface 122 of the touch pad 121 and a plurality of switches 125, for example. The operation surface 122 is disposed in the center of a body 120 having a rectangular shape. The plurality of switches 125 face each other while interposing the operation surface 122 therebetween.

The touch pad 121 allows electronic devices electromagnetically connected thereto to be controlled, for example. The touch pad 121 is configured such that instructions such as movement and selection of the cursor displayed on the display unit of the electronic device, and selection, determination, dragging, dropping of a displayed icon can be performed by operations by a pen or operating finger having electrical conductivity. The present embodiment will describe the operation made by a finger (operating finger).

A resistive film-type, infrared-type, Surface Acoustic Wave (SAW)-type, or electrostatic capacitance-type touch pad can be used as the touch pad 121, for example. An electrostatic capacitance-type touch pad is used as the touch pad of the embodiment, for example.

When the driving mode of the vehicle 9 is the manual driving mode, as illustrated in FIG. 2A, the touch pad 121 turns along with the steering wheel 10. It is easy for an operator to grip and operate the steering wheel 10 since the touch pad 121 turns along with the steering wheel 10.

In contrast, when the driving mode of a vehicle 9 is the self-driving mode, as illustrated in FIG. 2B, the touch pad 121 remains stationary relative to the vehicle 9, and does not turn along with the steering wheel 10. This touch pad 121 that remains stationary during the self-driving mode makes it easy for an operator to operate the operation surface 122.

The switches 125 are disposed at positions where they can easily be operated by an operator gripping the steering wheel 10. In the present embodiment, as illustrated in FIG. 1A as an example, two pairs of switches 125 face each other while interposing the operation surface 122 therebetween. These switches 125, as an example, are push switches.

Similar to the touch pad 121, when the vehicle 9 is in the self-driving mode, the switches 125 remain stationary and do not turn along with the steering wheel 10. In addition, when the vehicle 9 is in the manual driving mode, the switches 125 turn along with the steering wheel 10.

The input operation unit 12 generates and outputs input information S3 to the controller 16 on the basis of operation performed on the touch pad 121 and switches 125.

Configuration of Switching Unit 14

The switching unit 14 is configured to transmit driving force from the driving unit 92 to the steering wheel 10. In addition, the switching unit 14, as described above, is configured to allow only the steering wheel 10 to turn in the self-driving mode of the vehicle 9 and to allow the steering wheel 10 and the input operation unit 12 to turn together with each other in the manual driving mode.

That is, the switching unit 14 is configured to connect the steering wheel 10 and the input operation unit 12 to allow the steering wheel 10 and the input operation unit 12 to act as one body, and to cancel this connection to switch a turn to a turn of only the steering wheel 10. Furthermore, when the connection is canceled, the input operation unit 12 is fixed in its initial position by the switching unit 14 such that the input operation unit 12 is stationary relative to the vehicle 9. As illustrated in FIG. 1A, this initial position is the position at which the input operation unit 12 does not turn, for example.

The switching unit 14 switches the connection in accordance with a switching signal S2 output from the controller 16. The switching signal S2 is a signal generated by the controller 16 on the basis of the inputted mode signal S1.

Configuration of Controller 16

For example, the controller 16 is a microcomputer including a Central Processing Unit (CPU) that computes and processes acquired data according to stored programs, and Random Access Memory (RAM) and Read Only Memory (ROM) that are semiconductor memory. A program for operations of the controller 16, for example, is stored in the ROM. The RAM is used as a storage region that temporarily stores computation results and the like, for example.

The controller 16 is configured to control the switching unit 14 to cause the steering wheel 10 and the input operation unit 12 to turn together with each other in accordance with the input of the mode signal S1 indicating cancellation of the self-driving mode in which the operator operates the steering wheel 10.

That is, when the inputted mode signal S1 indicates the manual driving mode, the controller 16 generates and outputs the switching signal S2 for turning the steering wheel 10 and input operation unit 12 as one body to the switching unit 14. The switching unit 14 switches the connection such that the steering wheel 10 and the input operation unit 12 turn together with each other in accordance the inputted switching signal S2.

In addition, when the mode signal S1 indicating the self-driving mode is input, the controller 16 generates and outputs the switching signal S2 so that the input operation unit 12 does not move along with the turn of the steering wheel 10, and controls the switching unit 14.

Furthermore, when the vehicle 9 controls the turn of the steering wheel 10 for operator driving assistance in the manual driving mode, the driving unit 92 and the steering wheel 10 are connected. This driving assistance, as an example, includes assistance for spin prevention on snowy and other bad roads, assistance for lane keeping, and assistance for generating proper operational feeling. In which case, the input operation unit 12 may be configured to be directly driven by the driving unit 92, or configured to act as one body with the steering wheel 10 and turn together with the steering wheel 10. In the present embodiment, as an example, the steering wheel 10 and input operation unit 12 act as one body and are controlled for driving assistance in the manual driving mode.

The controller 16 is configured to, for example, generate and output operation information S4 to the vehicle controller 900 on the basis of input information S3 inputted from the input operation unit 12.

Configuration of Vehicle Control System 90

The vehicle control system 90, as illustrated in FIG. 1B as an example, includes a steering control device 1, a driving unit 92, a vehicle information generating unit 94, and a self-driving controller 96.

The driving unit 92 is configured to drive the steering wheel 10 via the switching unit 14. This driving unit 92, as an example, includes a motor. Furthermore, the driving unit 92, as stated above, may also drive the steering wheel 10 in the direction opposite to the turning direction of the steering wheel 10 to generate reaction force as driving assistance.

The driving unit 92 is controlled by a driving signal S5 outputted from the self-driving controller 96. The self-driving controller 96 generates the driving signal S5 on the basis of vehicle information S6 outputted from the vehicle information generation unit 94.

The vehicle information generating unit 94, as an example, is configured to acquire information on the vehicle 9, including the speed information, position information, map information, road information and route to destination information of the vehicle 9, and to generate the vehicle information S6. The vehicle information generating unit 94, as an example, acquires information on the vehicle 9 via the vehicle controller 900 of the vehicle 9. This vehicle controller 900 is an Electronic Controller Unit (ECU) configured to comprehensively control sensors and electronic devices on the vehicle 9.

The self-driving controller 96 is a microcomputer including, as an example, a CPU, a RAM, and a ROM. The self-driving controller 96 generates a mode signal S1 on the basis of a command signal S7 outputted from the vehicle controller 900.

The command signal S7 is a signal indicating transition to the manual driving mode or the self-driving mode, for example. When the command signal S7 is a signal indicating the manual driving mode, the self-driving controller 96 generates and outputs the mode signal S1 indicating the manual driving mode to the controller 16.

In addition, when the command signal S7 is a signal indicating the self-driving mode, the self-driving controller 96 generates and outputs the mode signal S1 indicating the self-driving mode, to the controller 16, and generates the driving signal S5 for controlling the driving unit 92.

The self-driving mode and the manual driving mode, as an example, are selected by operation of the mode switch by an operator. The vehicle controller 900 generates and outputs, for example, a command signal S7 on the basis of the operation of the mode switch, to the self-driving controller 96.

Figure 3:
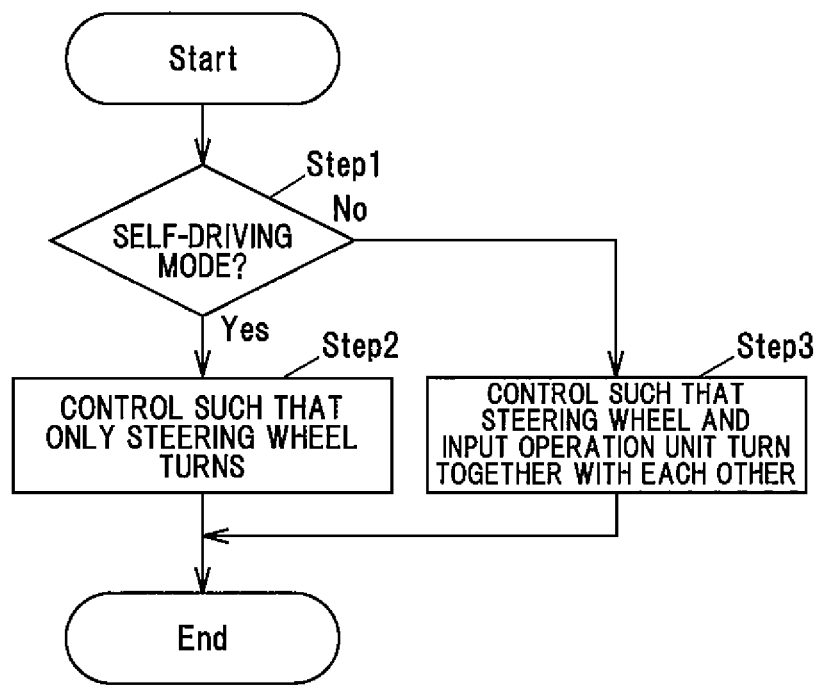
FIG. 3 is a flowchart illustrating the operation of a steering control device according to an embodiment.

Next, operations of the steering control device 1 will be described according to the flowchart in FIG. 3.

Operations

The controller 16 determines whether the driving mode of the vehicle 9 is the manual driving mode or the self-driving mode on the basis of the mode signal S1 input after the power supply of the vehicle 9 is turned on. When the driving mode of the vehicle 9 is the self-driving mode (Yes in Step 1), the controller 16 outputs the switching signal S2 corresponding to the determination result to control the switching unit 14 such that only the steering wheel 10 is driven by the driving unit 92 and turns (Step 2). As illustrated in FIG. 2B, the steering wheel 10 does not turn together with the input operation unit 12 and turns alone by a driving unit 92, for example.

In addition, when the driving mode of the vehicle 9 is the manual driving mode (No in Step 1), the controller 16 outputs the switching signal S2 corresponding to the determination result to control the switching unit 14 such that the steering wheel 10 and the input operation unit 12 turn together with each other (Step 3). As illustrated in FIG. 2A, the steering wheel 10 and the input operation unit 12 turn together with each other in accordance with operations by the operator, for example.

Effects of Embodiment

A steering control device 1 according to the present embodiment is good in the operability of the input operation unit 12 even in the self-driving mode. Specifically, in the manual driving mode, since the operator grips the steering wheel 10, it is easy for an operator to operate the input operation unit 12 which turns with the steering wheel 10. However, when the steering wheel 10 and the input operation unit 12 turn together with each other in the self-driving mode, the operator is required to operate the turning input operation unit 12, and the operability is not good compared to when the operator operates the input operation unit 12 remaining stationary relative to the operator. As an example, when an operator operates the input operation unit 12 in the self-driving mode and makes a command for passing, operability is good in a case that the input operation unit 12 does not turn. Consequently, in the steering control device 1, since the steering wheel 10 and the input operation unit 12 act as one body in the manual driving mode, and only the steering wheel 10 turns in the self-driving mode, the operability of the touch pad 121 and the switches 125 on the input operation unit 12 is always good.

Since the input operation unit 12 does not turn together with the steering wheel 10 in the self-driving mode, and the input operation unit 12 and the steering wheel 10 turn together with each other in the manual driving mode, the steering control device 1 is always good in operability compared to related devices configured with the input operation unit not turning regardless of the driving mode, and interposing of operator fingers and arms between the steering wheel 10 and input operation unit 12 is prevented.

Since the steering control device 1 is good in operability, and the interposing of fingers and arms is inhibited, compared to when using a configuration avoiding this, design constraints are few and design freedom is high.

Although several embodiments of the invention have been described above, these embodiments are merely examples and the invention according to the claims is not to be limited thereto. These novel embodiments may be implemented in various other forms, and various omissions, substitutions, changes, and the like can be made without departing from the spirit and scope of the invention. In addition, all the combinations of the features described in these embodiments are not necessarily needed to solve the technical problem. Further, these embodiments are included within the spirit and scope of the invention and also within the invention described in the claims and the scope of equivalents thereof.

REFERENCE SIGNS LIST

1 Steering control device
9 Vehicle
10 Steering wheel
12 Input operation unit
14 Switching unit
16 Controller
90 Vehicle control system
92 Driving unit
94 Vehicle information generating unit
96 Self-driving controller
120 Body
121 Touch pad
122 Operation surface
125 Switch
900 Vehicle controller

The invention claimed is:

1. A steering control device, comprising:
a steering wheel configured to allow a traveling direction of a vehicle to be adjusted depending on a performed turning operation;
an input operation unit disposed in a center region of the steering wheel, disconnectably connected to the steering wheel and configured to receive an input via a touch operation by an operator;
a switching connection control unit connected to the steering wheel and the input operation unit and configured to switch between a connected state and a disconnected state, such that, when the steering wheel is turned in the connected state, the steering wheel and the input operation unit turn together as one body, and when the steering wheel is turned in the disconnected state, the input operation unit is fixed in an initial position and only the steering wheel turns while the input operation unit remains stationary; and
a digital controller configured to control the switching connection and disconnection state of the switching connection control unit such that only the steering wheel turns in accordance with an input of an input signal indicating a start of a vehicle self-driving mode in which a turning operation of the steering wheel is automatically controlled.

2. The steering control device according to claim 1, wherein the digital controller is configured to control the switching connection control unit such that the steering wheel and the input operation unit turn together with each other in accordance with an input of an input signal indicating cancellation of the self-driving mode.

3. The steering control device according to claim 1, wherein the input operation unit comprises a touch pad configured to detect touch operation on an operation surface, and a switch disposed around the touch pad.

4. The steering control device according to claim 1, wherein the switching connection control unit is configured to allow the turn of the steering wheel together with the input operation unit by connection between the steering wheel and the input operation unit in a manual driving mode, and to allow the turn of only the steering wheel by cancellation of the connection between the steering wheel and the input operation unit in the self-driving mode.

5. The steering control device according to claim 1, wherein the switching connection control unit is configured to transmit a driving force from the driving unit to the steering wheel in the self-driving mode.

* * * * *